(12) United States Patent
Bryant et al.

(10) Patent No.: US 6,469,443 B1
(45) Date of Patent: Oct. 22, 2002

(54) CADMIUM-FREE AMBER AUTOMOTIVE LAMP

(75) Inventors: Johnny D. Bryant, Cookeville, MI (US); William F. Buchman, Jr., Washington, TN (US)

(73) Assignee: Federal-Mogul World-Wide, Inc., Southfield, MI (US)

( * ) Notice: Subject to any disclaimer, the term of this patent is extended or adjusted under 35 U.S.C. 154(b) by 84 days.

(21) Appl. No.: 09/813,236

(22) Filed: Mar. 20, 2001

(51) Int. Cl.[7] ............................................. H01J 61/30
(52) U.S. Cl. ..................... 313/636; 313/493; 445/22; 445/25; 445/27
(58) Field of Search ......................... 313/636, 493, 313/573; 501/4, 11, 53, 135, 69; 445/22, 23, 25, 26, 27, 56

(56) References Cited

U.S. PATENT DOCUMENTS

| | | | |
|---|---|---|---|
| 3,558,963 A | 1/1971 | Hanneman et al. | |
| 3,920,463 A | 11/1975 | Simms | |
| 3,935,018 A | 1/1976 | Ray et al. | |
| 4,015,966 A | 4/1977 | Weaver | |
| 4,238,705 A | * 12/1980 | Thomas | 313/318 |
| 4,336,303 A | 6/1982 | Rittler | |
| 4,461,839 A | 7/1984 | Rittler | |
| 4,746,462 A | 5/1988 | Nakamura et al. | |
| 4,762,568 A | 8/1988 | Nakamura et al. | |
| 4,806,268 A | 2/1989 | Kiss et al. | |
| 4,944,784 A | 7/1990 | Kohli et al. | |
| 5,045,510 A | 9/1991 | Kohli et al. | |
| 5,059,561 A | 10/1991 | Ciolek et al. | |
| 5,213,440 A | 5/1993 | Yeh et al. | |
| 5,258,336 A | 11/1993 | LaMastro et al. | |
| 5,486,991 A | 1/1996 | Bodem, Jr. | |
| 5,610,107 A | 3/1997 | Danielson et al. | |
| 5,656,559 A | 8/1997 | Combes et al. | |
| 5,716,706 A | 2/1998 | Morris | |
| 5,837,629 A | 11/1998 | Combes et al. | |
| 5,849,402 A | 12/1998 | Kraemling et al. | |
| 5,885,915 A | * 3/1999 | Bakoet et al. | 501/66 |
| 5,977,001 A | * 11/1999 | Suha et al. | 501/66 |
| 6,010,775 A | 1/2000 | Kraemling et al. | |
| 6,105,394 A | 8/2000 | Sridharan et al. | |

* cited by examiner

Primary Examiner—Ashok Patel
(74) Attorney, Agent, or Firm—Reising, Ethington, Barnes, Kisselle, Learman & McCulloch, P.C.

(57) ABSTRACT

An automotive lamp including a sealed envelope having a filament or other light emitting element contained therein, with the envelope being formed from a barium-silicate based glass that is essentially free of cadmium and that includes barium oxide in the range of 2.15%–2.25% by weight, strontium oxide in the range of 5.58%–5.82% by weight, potassium oxide in the range of 8.9%–9.3% by weight, and molybdenum oxide in the range of 0.068%–0.072% by weight. Specific amounts of other constituent components of the glass are also disclosed. The resulting lamp provides an amber color that meets applicable CIE chromaticity requirements for automotive lamps and the glass exhibits physical characteristics that are closely matched to that of lime glass, making it suitable for standard lamp manufacturing processes.

20 Claims, 2 Drawing Sheets

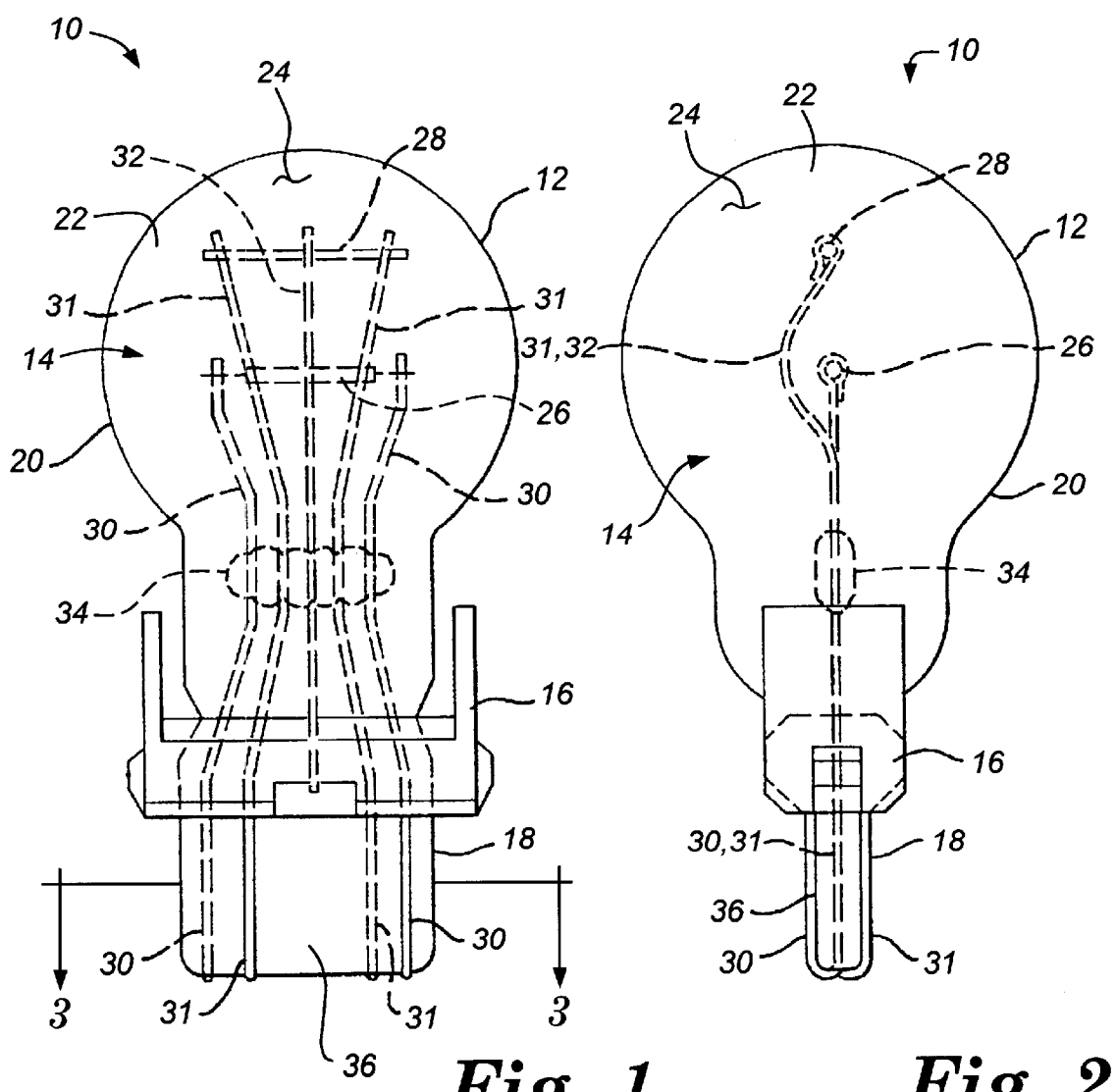
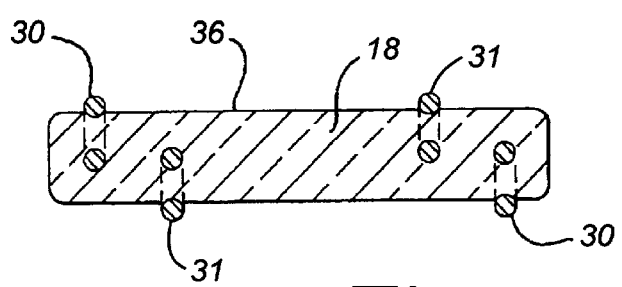
Fig. 1    Fig. 2
Fig. 3

CADMIUM-FREE AMBER AUTOMOTIVE LAMP

TECHNICAL FIELD

This invention relates generally to incandescent lamps and, more particularly, to automotive turn signals and other such lamps used to provide an amber color when illuminated.

BACKGROUND OF THE INVENTION

Amber colored incandescent lamps are used in automotive exterior lighting applications for such things as turn signals, parking lights, and marker lamps. These lamps produce a distinctive color that, in conjunction with the white light from headlamps and the red light from tail lamps and other such rearwardly-directed lighting, helps other drivers and pedestrians in quickly determining the orientation of the vehicle. Amber bulbs can also be used within the vehicle as indicator lamps and can be used in other diverse applications as well.

For purposes of automotive exterior lighting, the United States and certain other countries and regions have adopted regulations concerning the required spectral content for these amber lamps. These regulations help insure that the color of the emitted light has the distinctiveness desired to easily differentiate it from white and other colored light. Traditionally, the glass and/or glass coating used to produce these lamps have used cadmium as a coloring agent. However, as is known, the use of cadmium raises environmental concerns and has been classified as a toxic material. Consequently, various cadmium-free amber coatings have been developed that are applied to the surface of a standard borosilicate glass lamp. With these coatings can come various other problems, however. For example, some coatings reflect infrared light emitted by the filament back into the bulb, resulting in overheating of the bulb and a concomitant shortening of the bulb life. Other coatings fade or flake off as a result of the heat generated by the lamp. As a result, the use of cadmium-based amber lamps is still commonplace within the automotive industry.

More recently, newer coating technologies have begun to appear that are reputed to provide an amber color that meets SAE and ECE guidelines while avoiding the above-noted problems of more traditional cadmium-free coatings. While perhaps suitable for their intended purpose, these coatings nonetheless still involve the use of additional materials and processing steps that increase the overall cost of manufacturing the lamp.

It is therefore an object of this invention to provide an automotive lamp made from a cadmium-free glass that does not require a special coating to achieve the desired amber color.

SUMMARY OF THE INVENTION

In accordance with the invention, there is provided an automotive lamp that comprises a sealed envelope having a filament or other light emitting element contained therein, with the envelope being formed from a barium-silicate based glass that is essentially free of cadmium and that comprises barium oxide in the range of 2.15%–2.25% by weight and strontium oxide in the range of 5.58%–5.82% by weight. Preferably, the glass further comprises potassium oxide in the range of 8.9%–9.3% by weight and molybdenum oxide in the range of 0.068%–0.072%. Even more preferably, the glass consists essentially of the following elements in amounts that are within 2% of the following weight percentages:

| | |
|---|---|
| $SiO_2$ | 72% |
| $K_2O$ | 9.1% |
| SrO | 5.7% |
| $Na_2O$ | 5.5% |
| BaO | 2.2% |
| CaO | 2.1% |
| $Al_2O_3$ | 1.9% |
| MgO | 1.0% |
| $SO_3$ | 0.37% |
| $MoO_3$ | 0.07% |
| $Fe_2O_3$ | 0.03% |
| $P_2O_5$ | 0.02% |
| Cl | 0.01% |
| $TiO_2$ | trace. |

The lamp so constructed can provide an amber color that meets SAE and ECE colorimetry requirements for exterior vehicle lamps without the use of cadmium or special coatings. The envelope can be formed into a wedge base lamp to produce GT-8 and other industry-standard lamps.

In accordance with another aspect of the invention, a method of manufacturing an automotive lamp is provided using glass having the composition given above. The method uses a segment of glass tube having the above-noted composition. First, one end of the glass tube is softened using heat and then blown into a globe using a mold. Then, a light emitting element is inserted into the other end of the glass tube. Finally, a sealed envelope is formed containing the light emitting element, and this is done by softening that other end of the glass tube using heat and sealing that other end by melting of the glass together with the light emitting element contained inside.

BRIEF DESCRIPTION OF THE DRAWINGS

A preferred exemplary embodiment of the invention will hereinafter be discussed in conjunction with the appended drawings, wherein like designations denote like elements, and wherein:

FIG. 1 is a front view of an automotive lamp constructed in accordance with the invention;

FIG. 2 is a side view of the automotive lamp of FIG. 1;

FIG. 3 is a cross-sectional view of the wedge base portion of the lamp of FIG. 1 taken along with the 3—3 line of FIG. 1.

DETAILED DESCRIPTION OF THE PREFERRED EMBODIMENTS

Figure 4:
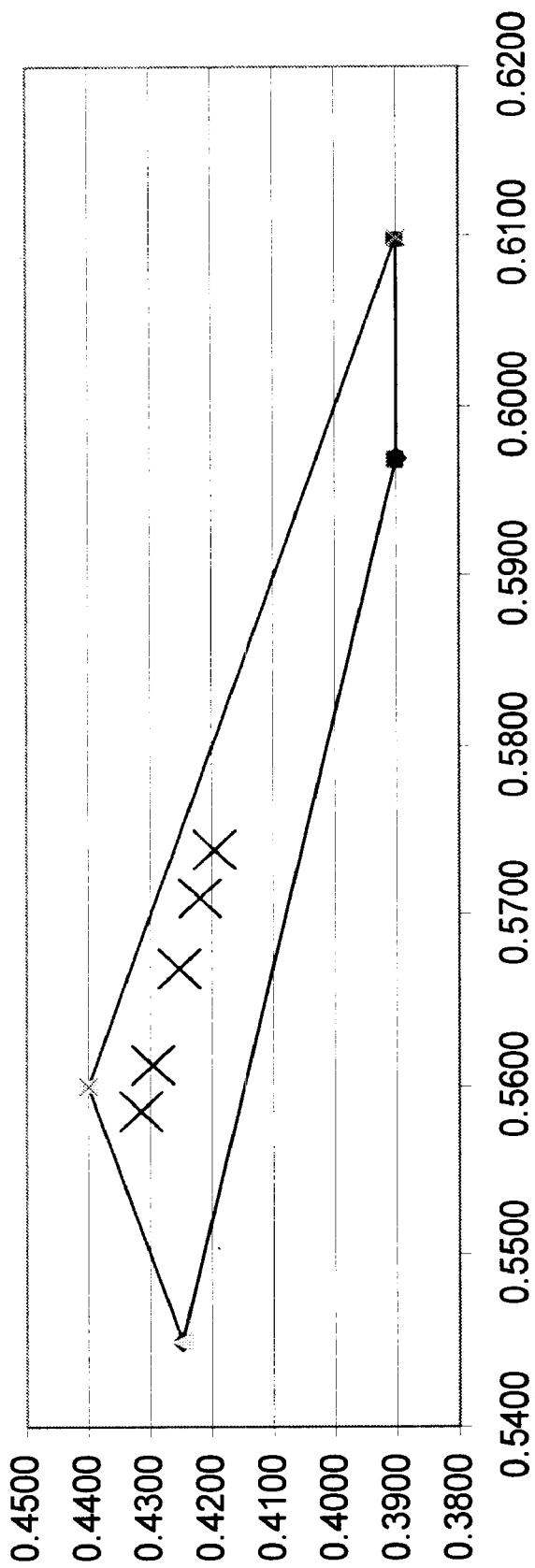
FIG. 4 is a graph depicting the CIE chromaticity boundaries for amber color lamps used in the United States.

Referring to FIGS. 1 and 2, there is shown an automotive lamp 10 which in general comprises a sealed glass envelope 12 containing a filament assembly 14 and supporting an outer sleeve 16. As used herein, an "automotive lamp" refers to a lamp that meets one or more automotive regulations or standards for the lamp. Such regulations and standards are well known to those skilled in the art. Envelope 12 is formed from glass and includes a sealed lower portion 18 and an upper portion 20 having a sealed interior region 22 in which there is provided an inert gas fill 24.

The filament assembly 14 includes a pair of filaments 26, 28, a number of lead-in or support wires 30–32, and a glass bridge 34 that maintains electrical isolation of the lead-in wires while providing additional structural support for the entire filament assembly 14. The two filaments 26, 28 are spaced from each other within the interior region 22 and can be independently operated and can be used to provide two different levels of lamp illumination, as is known. The lower filament 26 is supported by lead-in wires 30 that extend downward from the filament 26, through the bridge 34, and into the sealed lower portion 18 which is in the form of a wedge base. These lead-in wires 30 extend through the wedge base 18 to an exposed location on the outside surface 36 of the glass envelope 12. In particular, they exit the wedge base at its lowermost edge and run upward along the outer surface 36, terminating at a protected location underneath the outer sleeve 16. This construction provides an exposed portion of the wires for electrical connection of the lamp in circuit, and termination of the lead-in wires 30 underneath the outer sleeve helps prevent the exposed portions of the wires from being inadvertently bent outward away from the wedge base 18. The outer sleeve 16 is a resilient plastic piece that allows the lamp 10 to be securely, but removably, connected to a conventional socket (not shown), with the plastic sleeve cooperating with a conventional socket clip to retain the lamp within the socket in a known manner. A suitable socket design for the lamp 10 is disclosed in U.S. Pat. No. 5,486,991, the entire contents of which are hereby incorporated by reference.

The upper filament 28 is supported by lead-in wires 31 that are curved laterally as shown in FIG. 2 to maintain suitable spacing from filament 26, but that otherwise extend downward through envelope 12 and to an exposed location on outer surface 36 in the same manner as wires 30. The configuration of lead-in wires 30 and 31 as it exists at th wedge base 18 is more specifically shown in the cross-section of FIG. 3. Referring back to FIG. 1, the upper filament 28 is also supported by a third support wire 32 which provides mechanical support for the filament at its center. This wire 32 extends downwardly through the bridge 34 and into the wedge base 18, but is terminated there and does not extend to the exterior of the envelope since it is not used to provide operating power to the filament.

To provide the desired amber color, the envelope 12 is manufactured from a barium-silicate based glass that is essentially free of cadmium and that comprises barium oxide in the range of 2.15%–2.25% by weight, strontium oxide in the range of 5.58%–5.82% by weight, potassium oxide in the range of 8.9%–9.3% by weight, and molybdenum oxide in the range of 0.068%–0.072%. More preferably, the glass has the following composition in the following weight percentages.

| | |
|---|---|
| $SiO_2$ | 72% |
| $K_2O$ | 9.1% |
| SrO | 5.7% |
| $Na_2O$ | 5.5% |
| BaO | 2.2% |
| CaO | 2.1% |
| $Al_2O_3$ | 1.9% |
| MgO | 1.0% |
| $SO_3$ | 0.37% |
| $MoO_3$ | 0.07% |
| $Fe_2O_3$ | 0.03% |
| $P_2O_5$ | 0.02% |
| Cl | 0.01% |
| $TiO_2$ | trace. |

The ranges given above for the BaO, SrO, $K_2O$, and $MoO_3$ represent an approximately 2% variation on the specific percentages provided in the preceding list. The weight percentages of the other constituent elements can also be varied within two percent as well. The resulting glass is about 60–75% light transmissive, with the barium, strontium, potassium, and molybdenum oxides being believed to contribute to the amber color of the glass.

FIG. 4 graphically depicts the acceptable CIE x and y chromaticity coordinates for amber automotive lamps according to the applicable SAE regulations currently in effect in the United States. This plot depicts the relevant portion of the 1931 CIE chromaticity diagram. For ECE regulations used in Europe, the CIE coordinate boundary limits are, for red, y=0.398, for green, y=0.429, and, for white, y=0.993−x. These limits fall within the applicable SAE boundaries shown in FIG. 4. Five sample lamps were manufactured using glass obtained from Maeda Glass Co., LTD, of Tokyo, Japan, with the glass having the specific composition given above. These sample lamps had the following chromaticity coordinates, all of which fell within SAE boundaries.

| Lamp | x | y |
|---|---|---|
| 1 | 0.5740 | 0.4194 |
| 2 | 0.5711 | 0.4220 |
| 3 | 0.5669 | 0.4253 |
| 4 | 0.5586 | 0.4315 |
| 5 | 0.5612 | 0.4295 |

Thus, it will be appreciated that this composition provides amber coloring that meets the amber color requirements for automotive lamps without the use of cadmium or coatings or there inherent disadvantages. Furthermore, glass having the above described composition closely matches the physical properties of lime glass, making it suitable for use in manufacturing automotive lamps using existing machinery and conventional processes. A preferred conventional process that can be used to manufacture lamp 10 will now be described.

For purposes of manufacturing the lamp, the glass is initially formed into an elongated tube, with the glass tube then being cut into segments of suitable length for manufacturing individual bulbs. One end of the segment of glass tube is softened using heat and then blown into a globe then cut to length to make an individual bulb. This can be done using a mold with the tube being expanded by air pressure while it is softened to form the enlarged upper portion 20 shown in FIGS. 1 and 2. Then, the filament assembly 14 is inserted into the other end of the glass tube. This filament assembly is pre-manufactured using the bridge 34 to hold the lead-in wires and filaments together as a single unit. Next, a sealed envelope is formed containing the light emitting element, and this is done by softening the then still open end of the glass tube using heat and sealing that open end by melting of the glass together with the light emitting element contained inside. This can be done using a press to seal the glass together and form the wedge-shaped lower portion 18. For purposes of working the glass, its softening point is 690° C., annealing is at 510° C., and a working temperature of 1150° C. can be used. To remove the air during this sealing operation, the envelope is flushed with krypton while being sealed. Also, a zirconium getter is placed into the interior region 22 before sealing to absorb any residual oxygen.

It will thus be apparent that there has been provided in accordance with the present invention an automotive lamp which achieves the aims and advantages specified herein. It will of course be understood that the foregoing description is of preferred exemplary embodiments of the invention and that the invention is not limited to the specific embodiments shown. Various changes and modifications will become apparent to those skilled in the art. For example, the lamp can be manufactured using only a single filament. Also, rather than one of more filaments, other light emitting elements can be used, such as an ionizable gas with interior or exterior electrodes being used to provide suitable ionization of the gas. All such variations and modifications are intended to come within the scope of the appended claims.

We claim:

1. An automotive lamp for use in exterior vehicle lighting applications, said lamp including a sealed envelope having a light emitting element contained therein, wherein said envelope is formed from a barium-silicate based glass that is essentially free of cadmium and that comprises barium oxide in the range of 2.15%–2.25% by weight and strontium oxide in the range of 5.58%–5.82% by weight.

2. An automotive lamp as defined in claim 1, wherein said glass further comprises potassium oxide in the range of 8.9%–9.3% by weight and molybdenum oxide in the range of 0.068%–0.072% by weight.

3. An automotive lamp as defined in claim 1, wherein said light emitting element comprises a tungsten filament mounted within said envelope.

4. An automotive lamp as defined in claim 3, further comprising a second tungsten filament mounted within said envelope, wherein said filaments are spaced from each other within said envelope.

5. An automotive lamp as defined in claim 3, wherein said lamp includes a wedge base comprising a sealed lower portion of said envelope.

6. An automotive lamp as defined in claim 5, wherein said lamp includes a pair of lead-in wires that support said filament within said envelope and that extend through said wedge base from an exposed location on an outside surface of said envelope to an interior region of said envelope.

7. An automotive lamp as defined in claim 5, wherein said wedge base further comprises a plastic sleeve attached to said sealed lower portion of said envelope.

8. An automotive lamp for use in exterior vehicle lighting applications, said lamp including a sealed envelope of amber color having a light emitting element contained therein, wherein said envelope is formed from glass that is essentially free of cadmium and that consists essentially of the following elements in amounts that are within 2% the following weight percentages:

| | |
|---|---|
| $SiO_2$ | 72% |
| $K_2O$ | 9.1% |
| SrO | 5.7% |
| $Na_2O$ | 5.5% |
| BaO | 2.2% |
| CaO | 2.1% |
| $Al_2O_3$ | 1.9% |
| MgO | 1.0% |
| $SO_3$ | 0.37% |
| $MoO_3$ | 0.07% |
| $Fe_2O_3$ | 0.03% |
| $P_2O_5$ | 0.02% |
| Cl | 0.01% |
| $TiO_2$ | trace. |

9. An automotive lamp as defined in claim 8, wherein said light emitting element comprises a tungsten filament mounted within said envelope.

10. An automotive lamp as defined in claim 9, further comprising a second tungsten filament mounted within said envelope, wherein said filaments are spaced from each other within said envelope.

11. An automotive lamp as defined in claim 9, wherein said lamp includes a wedge base comprising a sealed lower portion of said envelope.

12. An automotive lamp as defined in claim 11, wherein said lamp includes a pair of lead-in wires that support said filament within said envelope and that extend through said wedge base from an exposed location on an outside surface of said envelope to an interior region of said envelope.

13. An automotive lamp as defined in claim 11, wherein said wedge base further comprises a plastic sleeve attached to said sealed lower portion of said envelope.

14. A method of manufacturing an automotive lamp, comprising the steps of:

(a) providing a segment of glass tube that is essentially free of cadmium and that consists essentially of following elements in amounts that are within 2% of the following weight percentages:

| | |
|---|---|
| $SiO_2$ | 72% |
| $K_2O$ | 9.1% |
| SrO | 5.7% |
| $Na_2O$ | 5.5% |
| BaO | 2.2% |
| CaO | 2.1% |
| $Al_2O_3$ | 1.9% |
| MgO | 1.0% |
| $SO_3$ | 0.37% |
| $MoO_3$ | 0.07% |
| $Fe_2O_3$ | 0.03% |
| $P_2O_5$ | 0.02% |
| Cl | 0.01% |
| $TiO_2$ | trace. |

(b) softening one end of the glass tube using heat and sealing the one end of the glass tube by melting of the glass together; and (c) inserting a light emitting element into the other end of the glass tube; and (d) forming a sealed envelope containing the light emitting element by softening said other end of the glass tube using heat and sealing said other end by melting of the glass together with the light emitting element contained inside.

15. The method of claim 14, wherein step (c) further comprises inserting a tungsten filament assembly into said glass tube, where said tungsten filament assembly includes a tungsten filament mounted on a pair of lead-in wires with an insulating bridge that physically maintains separate of the lead-in wires to thereby maintain electrical isolation of the lead-in wires from each other.

16. The method of claim 15, wherein step (d) further comprises melting the glass together into a wedge base such that the lead-in wires extend from the bridge through the wedge base and out to an exposed location outside of said envelope.

17. The method of claim 16, wherein step (d) further comprises bending the lead-in wires at the exposed location so that they rest upon the outside surface of the envelope.

18. The method of claim 16, further comprising the step of (e) attaching a plastic sleeve to the wedge base.

19. The method of claim 15, wherein said tungsten filament assembly includes a second tungsten filament mounted on a second pair of lead-in wires that are supported by said bridge in electrical isolation from each other.

20. The method of claim 14, wherein step (c) further comprises inserting a getter into the glass tube and wherein step (d) further comprises replacing air in the glass tube with an inert gas during sealing of said other end.

* * * * *

UNITED STATES PATENT AND TRADEMARK OFFICE
CERTIFICATE OF CORRECTION

PATENT NO.    : 6,469,443 B1
DATED         : October 22, 2002
INVENTOR(S)   : Johnny D. Bryant and William F. Buchman, Jr.

It is certified that error appears in the above-identified patent and that said Letters Patent is hereby corrected as shown below:

<u>Title page,</u>
Item [75], Inventors, after "Cookeville" delete "MI" and insert therefor -- TN --; and after "Washington" delete "TN" and insert therefor -- MI --.

<u>Column 3,</u>
Line 32, after "exists at" delete "th" and insert therein -- the --.

<u>Column 4,</u>
Line 31, after "coatings or" delete "there" and insert therein -- their --.

Signed and Sealed this

Twelfth Day of August, 2003

JAMES E. ROGAN
*Director of the United States Patent and Trademark Office*